United States Patent
Martinez

(10) Patent No.: US 6,889,500 B1
(45) Date of Patent: May 10, 2005

(54) ENGINE EXHAUST EXTRACTOR

(76) Inventor: Roy Martinez, 11552 Falconhill Dr., Whittier, CA (US) 90604

(*) Notice: Subject to any disclaimer, the term of this patent is extended or adjusted under 35 U.S.C. 154(b) by 0 days.

(21) Appl. No.: 10/789,789

(22) Filed: Mar. 1, 2004

(51) Int. Cl.$^7$ ............................................. F02B 27/02
(52) U.S. Cl. ................................................ 60/312
(58) Field of Search .................... 60/311, 324, 312; 181/279, 280

(56) References Cited

U.S. PATENT DOCUMENTS

| | | | | |
|---|---|---|---|---|
| 1,157,256 A | * | 10/1915 | Schmitt | 181/280 |
| 1,411,606 A | * | 4/1922 | Brereton | 55/395 |
| 1,797,310 A | * | 3/1931 | Wright | 181/280 |
| 3,061,416 A | * | 10/1962 | Kazokas | 422/176 |
| 3,633,343 A | * | 1/1972 | Mark | 96/118 |
| 3,813,854 A | * | 6/1974 | Hortman | 55/399 |
| 6,213,251 B1 | | 4/2001 | Kesselring | 181/249 |
| 6,679,351 B2 | | 1/2004 | Cummings et al. | 181/212 |

* cited by examiner

*Primary Examiner*—Thomas Denion
*Assistant Examiner*—Diem Tran
(74) *Attorney, Agent, or Firm*—Edgar W. Averill, Jr.; Kenneth L. Green

(57) ABSTRACT

A device for engine exhaust extraction improves engine performance and efficiency. The device includes outer and inner tubes sharing a central axis. The inner tube is held in place by supports connected between the inner tube and the outer tube, which supports have a fan-like orientation. Helically oriented vanes reside on an outer surface of the inner tube, which vanes extend outward. An inlet flow separates into an outer flow between the inner tube and the outer tube and an inner flow inside the inner tube. The fanblade-like supports and helically oriented vanes cause the outer flow to rotate about the central axis of the device. The flow recombine near the device outlet.

19 Claims, 4 Drawing Sheets

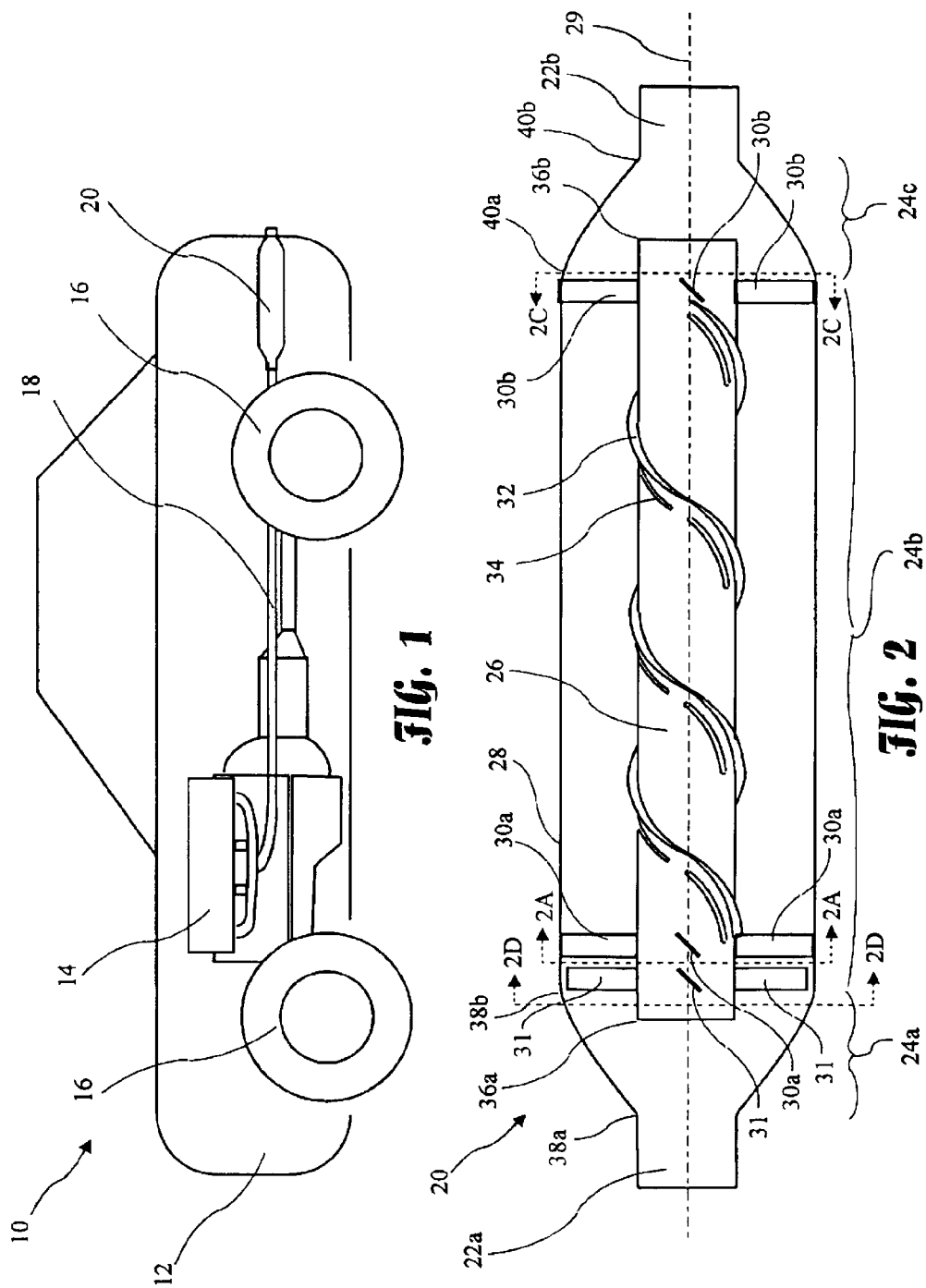

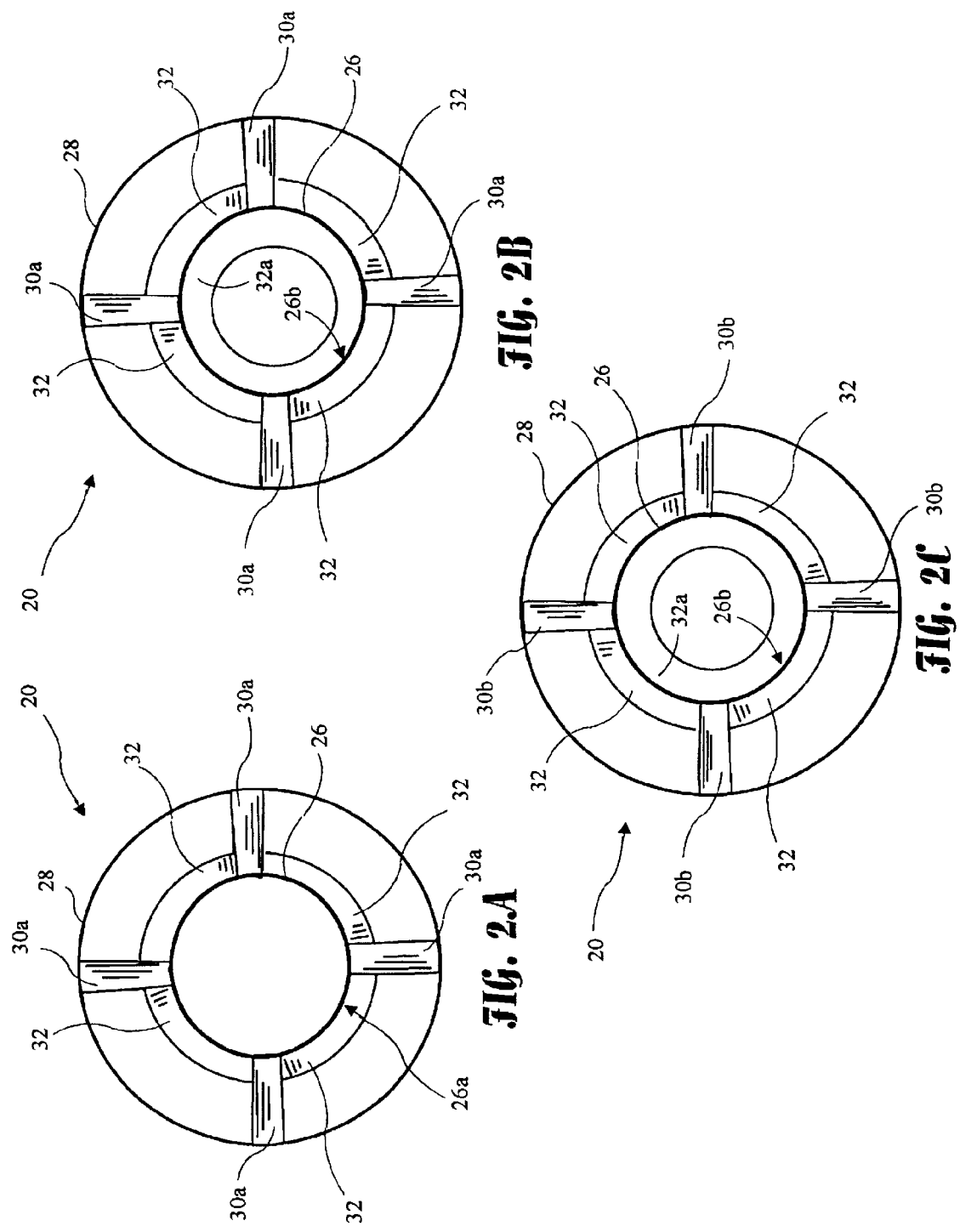

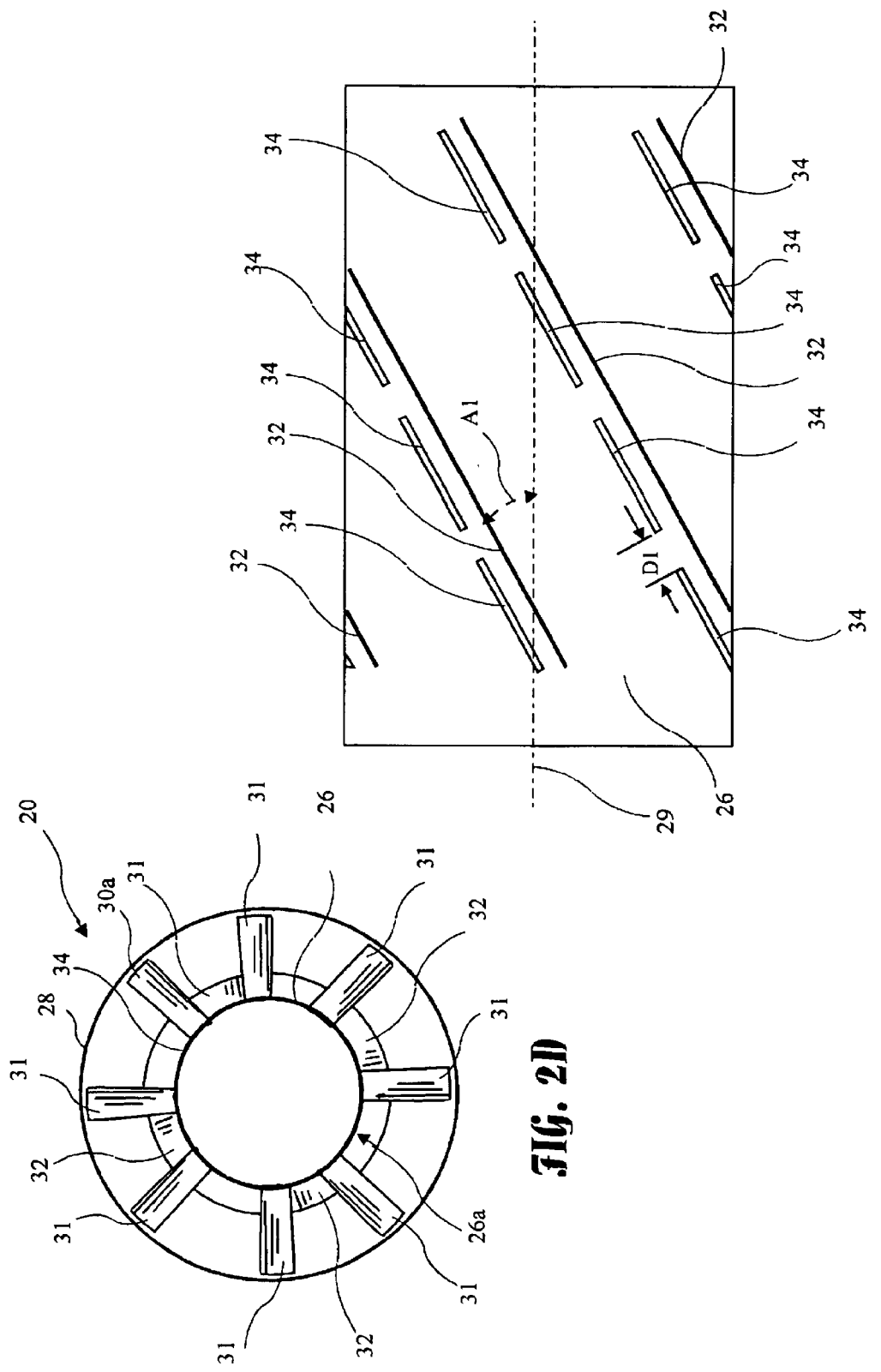

ENGINE EXHAUST EXTRACTOR

BACKGROUND OF THE INVENTION

The present invention relates to improving the efficiency of internal combustion engine, and in particular to an exhaust system which aids in extracting exhaust gases from the combustion chamber.

There is a continuing desire to improve the performance, efficiency, and environmental friendliness of internal combustion engines. Cars, motorcycles, and event trucks are raced every weekend in the United States. Even a small increase in power can provide a dramatic advantage in racing. The efficiency of exhaust systems is known to be a critical aspect of engine performance, and attempts to improve exhaust systems to unlock power have been ongoing for many years.

Increasing energy costs have also motivated manufactures to continually seeks to improve vehicle mileage, both to gain market share, and to satisfy government mileage requirements. Improvements to exhaust systems in the form of reduced restriction and tuned lengths have become common place, and vehicle mileage has somewhat benefitted from such efforts. However, meeting federally mandated mileage requirements remains a challenge, and further improvements are necessary.

Reducing pollution continues to be an important societal objective. Pollution levels in metropolitan areas remain unacceptably high at times, and create an immediate direct health issue for humans, and a longer term issue due to the damage to plant life. Automotive based pollution remains an issue, and auto makers are continually challenged to reduce the emissions from new automobiles. Further, the emissions from older vehicles continues even if new vehicles achieve significant emission reductions.

Modern automobiles greatly benefit from Electronic Fuel Injection (EFI) systems and efficient intake manifold and head designs. As a result, new automobiles have greatly improved economy and reduced emissions. But while the intake aspect of engine design has advanced drastically, exhaust systems have not similarly advanced. U.S. Pat. No. 6,213,251 issued Apr. 10, 2001 for "Self Tuning Exhaust Muffler," describes a muffler having an outer tube and an inner louver tube, wherein a spiral vane extending from the louver tube to the outer tube and forming a helical passage for a flow between the louver tube and the outer tube. A multiplicity of "scoops" on the inside wall of the louvered tube "scoop" an outer portion of the flow through the louvered tube into the helical passage.

U.S. Pat. No. 6,679,351 issued Jan. 20, 2004 for "Air Turbine for Combustion Engine," describes an "air turbine" apparatus creating a rotational flow which creates a muffling effect without restricting flow. The apparatus of the '351 patent includes annular recesses (or convolutions) at the forward end (i.e., before the diameter increases) of the apparatus, which are intended to create a cyclone or vortex effect in the air flow. Following the annular recesses, the air flow enters an expansion chamber, wherein an airfoil is positioned at the front of the expansion chamber to split the air flow into a high velocity lower pressure outer vortex, and a lower velocity higher pressure inner vortex. The air foil is shown in several figures of the '351 patent, and clearly plays the dominant role in the flow characteristics of a muffler according to the '351 patent and is essential to the described invention. Further, in column 4, lines 22–25, the '351 patent states that "the ratio of air passing around the airfoil compared to the air passing through the airfoil for a six inch diameter expansion chamber is approximately 2.7 to 1," indicating that the air foil plays the dominant role on controlling air flow through the muffler. Additionally, FIG. 10 of the '351 patent shows an embodiment of the invention of the '351 patent which essentially consists of the annular rings and the airfoil, and the inner tube 22 is entirely absent.

Although attempts have been made to improve performance and efficiency through modifications to exhaust systems, there remains a need to improve overall engine performance, improve mileage, and reduce pollution.

BRIEF SUMMARY OF THE INVENTION

The present invention addresses the above and other needs by providing a device for engine exhaust extraction which improves engine performance and efficiency. The device includes outer and inner tubes sharing a central axis. The inner tube is held in place by supports connected between the inner tube and the outer tube, which supports have a fan-like orientation. Helically oriented vanes reside on an outer surface of the inner tube, which vanes extend outwardly. An inlet flow separates into an outer flow between the inner tube and the outer tube and an inner flow inside the inner tube. The fanblade-like supports and helically oriented vanes cause the outer flow to rotate about the central axis of the device. The flows recombine near the device outlet.

In accordance with one aspect of the invention, there is provided an exhaust extracting device comprising an outer tube and an inner tube. The outer tube has an inlet, an inlet adapter portion, an increased diameter center portion, an outlet adapter portion, an outlet, and a central axis. The inlet adapter portion is between approximately four inches long and approximately six inches long and has an inlet adapter entrance and an inlet adapter exit. The outlet adapter portion is between approximately four inches long and approximately six inches long and has an outlet adapter entrance and an outlet adapter exit. The inner tube is substantially co-axial with the outer tube. The inner tube has an outer surface and an inner surface, an inner tube entrance, and an inner tube exit. Helically oriented vanes extend outward from the outer surface of the inner tube between approximately three sixteenths and approximately one fourth inches. The vanes may also extend between approximately three sixteenths and approximately one fourth inches inwardly from the inside surface of the inner tube.

Between three and ten inlet supports are proximal to the inner tube entrance and between three and ten outlet supports are proximal to the inner tube exit. The supports extend between the inner tube and the outer tube, and the supports are substantially orthogonal to the outer surface of the inner tube. The supports have a fanblade-like orientation, wherein the vanes and supports cooperate to cause an outer air flow between the inner tube and the outer tube to rotate. The inner tube entrance resides at between approximately twenty five percent and approximately one hundred percent of the distance between the inlet adapter entrance and the inlet adapter exit, and the inner tube exit resides at between approximately zero percent and approximately seventy five percent of the distance between the outlet adapter entrance and the outlet adapter exit.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is an engine powered vehicle utilizing the exhaust extractor of the present invention.

FIG. 2 is a cut-away view of the internal structure of the exhaust extractor.

FIG. 2A shows a first cross-sectional view taken along line 2A—2A of FIG. 2 of the exhaust extractor.

FIG. 2B shows a second cross-sectional view taken along line 2A—2A of FIG. 2 of the exhaust extractor.

FIG. 2C shows a first cross-sectional view taken along line 2C—2C of FIG. 2 of the exhaust extractor.

FIG. 2D shows a first cross-sectional view taken along line 2D—2D of FIG. 2 of the exhaust extractor.

FIG. 3 shows an "unwrapped" view of an inner tube with spiral vanes and reliefs according to the present invention.

Corresponding reference characters indicate corresponding components throughout the several views of the drawings.

DETAILED DESCRIPTION OF THE INVENTION

Figure 5:
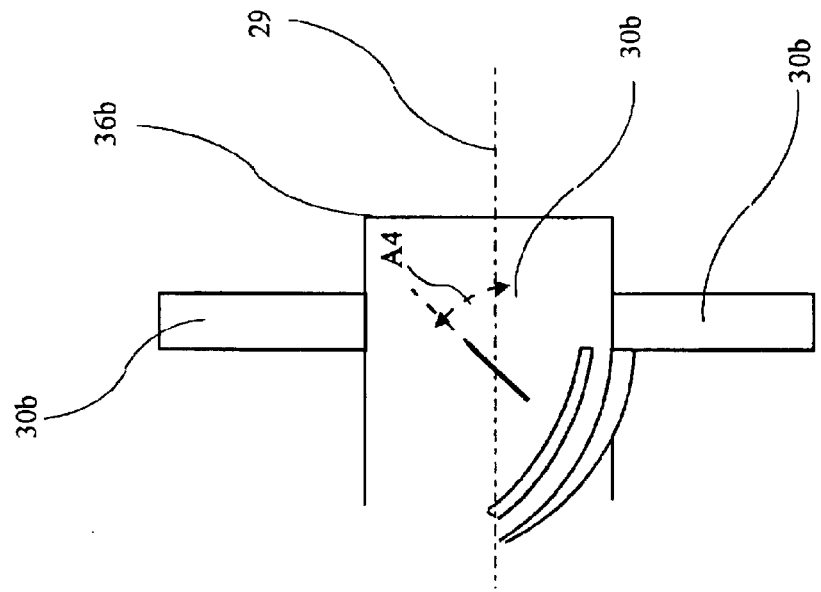
FIG. 5 shows detailed view of the outlet end of the inner tube and supports according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A vehicle 10 includes a body 12, an engine 14, and wheels 16 and shown in FIG. 1. The engine consumes fuel and produces exhaust which passes through an exhaust pipe 18 and exits the vehicle through an exhaust extractor 20. The exhaust extractor 20 may be used independently, or in conjunction with other exhaust devices such as a catalytic converter or a muffler. In vehicles with two or more exhaust pipes 18, one exhaust extractor 20 may be used with each exhaust pipe.

A cut away view of the exhaust extractor 20 is shown in FIG. 2. The exhaust extractor 20 includes an outer tube 28 comprising an inlet 22a and an outlet 22b, an inlet adapter portion 24a, a center portion 24b, and an outlet adapter portion 24c. The inlet adapter portion 24a and the outlet adapter portion 24c may be rounded (i.e., shoulder-like) portions as shown in FIG. 2, may be conical, and may be a mix of rounded and conical portions. The inlet adapter portion 24a has an inlet adapter entrance 38a and an inlet adapter exit 38b, and the outlet adapter portion 24c has an outlet adapter entrance 40a and an outlet adapter exit 40b. A central axis 29 runs through the length of the outer tube 28. The center portion 24b of the outer tube 28 is preferably between approximately 2.5 inches in diameter to approximately five inches in diameter, and preferably between approximately fourteen inches long and approximately twenty inches long.

Continuing with FIG. 2, the exhaust extractor 20 further includes an inner tube 26 which is substantially co-axial with the outer tube 28. Inlet fan blades 31 are attached to the inner tube 26 and extend outwardly to preferably within approximately 0.01 inches and approximately 0.03 inches of the outer tube 28. Helically oriented vanes 32 are attached to the inner tube 26 and extend outward from the inner tube 26. Reliefs 34 are cut into the inner tube 26 in a helical pattern similar to the orientation of the vanes 32, which reliefs 34 are preferably substantially parallel to the vanes 32. Front tube supports 30a connect the inner tube 26 to the outer tube 28, and are attached to the inner tube 26 proximal to an inner tube entrance 36a, and rear tube supports 30b connect the inner tube 26 to the outer tube 28, and are attached to the inner tube 26 proximal to an inner tube exit 36b. The supports 30a, 30b have a fanblade-like orientation (i.e., are angled relative to the central axis 29.) The vanes 32 and supports 30a, 30b cooperate to cause an outer air flow between the inner tube and the outer tube to rotate.

There are preferably between three and ten inlet supports 30a proximal to the inner tube entrance 36a and between three and ten outlet supports 30b proximal to the inner tube exit 36b, and there are more preferably four inlet supports 30a proximal to the inner tube entrance 36a and four outlet supports 30b proximal to the inner tube exit 36b. The inlet supports 30a are preferably turned at between approximately thirty five degrees and approximately fifty five degrees from the central axis 29, and the outlet supports 30b are turned at approximately sixty degrees from the central axis 29. The supports 30a, 30b are more preferably between approximately one half inches long and approximately five eights inches long, and are preferably turned at approximately forty five degrees from the central axis 29.

The inlet adapter portion 24a is preferably between approximately four inches long and approximately six inches long, and the outlet adapter portion is preferably between approximately four inches long and approximately six inches long. The inner tube entrance 36a preferably resides outwardly with respect to the inlet adapter exit 38b toward the inlet adapter entrance 38a between zero and seventy five percent of the distance between the inlet adapter exit 38b and the inlet adapter entrance 38a, and more preferably resides at approximately thirty three percent of the distance between the inlet adapter exit 38b and the inlet adapter entrance 38a. The inner tube exit 36b preferably resides outwardly with respect to the outlet adapter entrance 40a toward the outlet adapter exit 40b between zero and seventy five percent of the distance between the outlet adapter entrance 40a and the outlet adapter exit 40b, and more preferably resides at approximately thirty three percent of the distance between the outlet adapter entrance 40a and the outlet adapter exit 40b. As herein described, entrance refers to a point of entrance of exhaust flow into a portion of the exhaust extractor 20, and exit refers to a point of exit of exhaust flow from a portion of the exhaust extractor 20.

A first cross-sectional view of the exhaust extractor 20 taken along line 2A—2A of FIG. 2 is shown in FIG. 2A. The vanes 32 are seen to extend outward from an outer surface 26a of the inner tube 26. The vanes 32 preferably extend between approximately three sixteenths and approximately one fourth inches outwardly from the outside surface 26a of the inner tube 26. The fanblade like supports 30a extend from the inner tube 26 to the outer tube 28, and provide support for the inner tube 26 proximal to the inner tube entrance 26a.

A second cross-sectional view of an alternative embodiment of the exhaust extractor 20 taken along line 2A—2A of FIG. 2 is shown in FIG. 2B. The second embodiment is shown with internal vanes 32a extending inwardly from an internal surface 26b of the inner tube. The internal vanes 32a are preferably inward extensions of the vanes 32 extending outward from the outer surface 26a. The vanes 32a preferably extend between approximately three sixteenths and approximately one fourth inches inwardly from the inside surface 26b of the inner tube 26.

A cross-sectional view of the exhaust extractor 20 taken along line 2C—2C of FIG. 2 is shown in FIG. 2C. The fanblade like supports 30b extend from the inner tube 26 to the outer tube 28, and provide support for the inner tube 26 proximal to the inner tube exit 26b.

A cross-sectional view of the exhaust extractor 20 taken along line 2D—2D of FIG. 2 is shown in FIG. 2D. The inlet fan blades 31 extend from the inner tube 26 toward the outer tube 28. There are preferably four to ten inlet fan blades 31, and more preferably eight inlet fan blades 31.

An unwrapped view of the inner tube 26 is shown in FIG. 3. The vanes 32 are preferably pairs of vanes 32 residing one hundred and eighty degrees apart on the inner tube 26. The vanes 32 run continuously between the tube supports 30a and 30b, and are preferably constructed from between approximately two inch and approximately three inch segments, which segments are butted against each other. The reliefs 34 are substantially parallel to the vanes, and preferably are between approximately one eighth inches and approximately three sixteenths inches wide. The vanes 32 and the reliefs 34 are at an angle A1 from the central axis 29, which angle A1 is preferably between twenty five degrees and forty degrees, and more preferably approximately thirty degrees.

Figure 4:
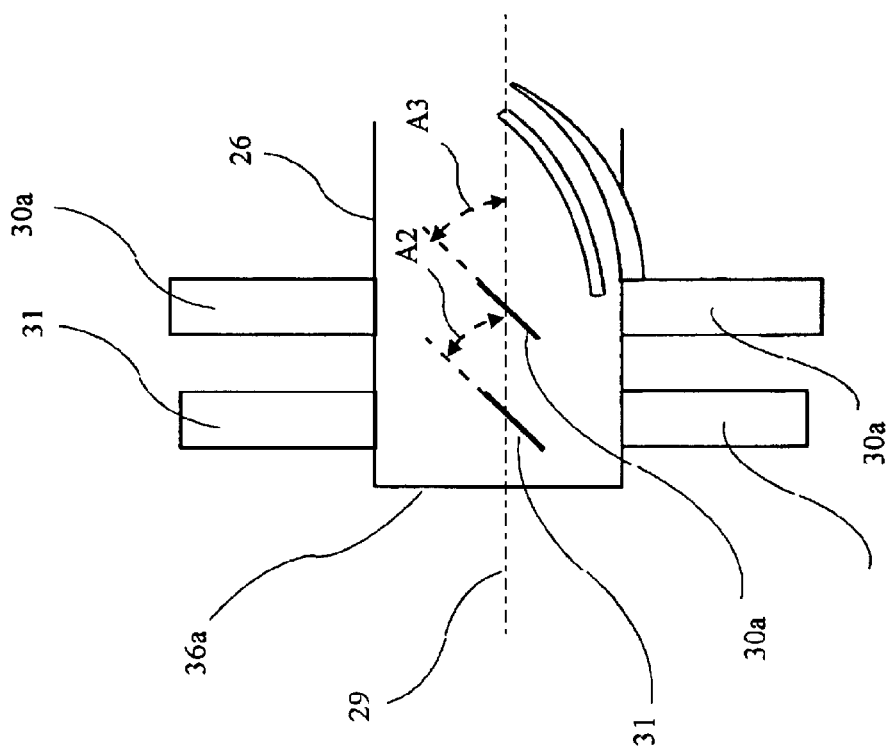
FIG. 4 shows a detailed view of the inlet end of the inner tube and supports according to the present invention.

A detailed view of the inner tube entrance 36a is shown in FIG. 4. The inlet fan blades 31 and the supports 30a are shown extending substantially orthogonal to the inner tube 26. The inlet fan blades 31 are at an angle A2 to the central axis 29, which angle A2 is preferably approximately forty five degrees. The supports 30a are at an angle A3 to the central axis 29, and the angle A3 is preferably between approximately thirty five degrees and approximately fifty five degrees from the central axis, and is more preferably thirty degrees from the central axis.

A detailed view of the inner tube exit 36b is shown in FIG. 5. The supports 30b are shown extending substantially orthogonal to the inner tube 26. The supports 30d are at an angle A4 to the central axis 29, and the angle A3 is preferably between approximately thirty five degrees and approximately fifty five degrees from the central axis, and is more preferably thirty degrees from the central axis.

An exhaust extractor 20 according to the present invention has been constructed and tested on a variety of vehicles. It is believed that the outer flow between the inner tube 26 and the outer tube 28 is accelerated and converted into a vortex like flow by the helically oriented vanes 32 and fanblade like supports 30a, 30b. Thus accelerated, when the flows recombine in the outlet adaptor portion 24c, the flow through the inner tube is drawn out of the inner tube 26, thereby extracting the exhaust from the engine 14, and improving performance. The results of testing before and after installation of one or more exhaust extractors 20 are summarized in Table 1. As can be seen, the performance improvements were substantial. Although it is believed that the performance improvements are obtained as described above, the present invention is not limited to a device functioning as described, and any device functioning in any manner, which device is as described and claimed herein, is intended to come within the scope of the present invention.

TABLE 1

| Vehicle | Original | With Exhaust Extractor |
| --- | --- | --- |
| 1989 Toyota Pickup (carburetor) 2.2 Ltr | 139 foot pounds torque HC .53 CO .23 | 191 foot pounds torque HC .10 CO .01 |
| 1995 Mustang GT 5.0 1996 Dodge Pickup | 241 foot pounds torque | 298+ foot pounds torque |
| 2003 Mustang Mach 1 | 168 foot pounds torque | 180 foot pounds torque |

While the invention herein disclosed has been described by means of specific embodiments and applications thereof, numerous modifications and variations could be made thereto by those skilled in the art without departing from the scope of the invention set forth in the claims.

I claim:

1. An exhaust extracting device comprising:
   an outer tube having an inlet, an inlet adapter portion, an increased diameter center portion, an outlet adapter portion, an outlet, and a central axis;
   an inner tube substantially co-axial with said outer tube, the inner tube having an outer surface;
   helically oriented vanes extending outward from the outer surface of the inner tube;
   reliefs in the inner tube, wherein the reliefs are substantially parallel to the vanes; and
   at least two supports extending between the inner tube and the outer tube, wherein the supports are substantially orthogonal to the outer surface of the inner tube, and have a fanblade like orientation, wherein the vanes and supports cooperate to cause an outer air flow between the inner tube and the outer tube to rotate.

2. The device of claim 1, wherein:
   the inlet adapter portion is between approximately four inches long and approximately six inches long;
   the outlet adapter portion is between approximately four inches long and approximately six inches long;
   the inner tube has an inner tube entrance and an inner tube exit;
   the inlet adapter portion of the outer tube has an inlet adapter entrance and an inlet adapter exit;
   the outlet adapter portion of the outer tube has an outlet adapter entrance and an outlet adapter exit;
   the inner tube entrance resides outwardly with respect to the inlet adapter exit toward the inlet adapter entrance between zero and seventy five percent of the distance between the inlet adapter exit and the inlet adapter entrance; and
   the inner tube exit resides outwardly with respect to the outlet adapter entrance toward the outlet adapter exit between zero and seventy five percent of the distance between the outlet adapter entrance and the outlet adapter exit.

3. The device of claim 2, wherein the inner tube entrance resides at approximately thirty three percent of the distance between the inlet adapter exit and the inlet adapter entrance.

4. The device of claim 2, wherein the inner tube exit resides at approximately thirty three percent of the distance between the outlet adapter entrance and the outlet adapter exit.

5. The device of claim 1, wherein the center portion of the outer tube is between approximately 2.5 inches in diameter to approximately five inches in diameter.

6. The device of claim 1, wherein the center portion of the outer tube is between approximately fourteen inches long and approximately twenty inches long.

7. The device of claim 1, wherein the inner tube has an inner tube entrance and an inner tube exit; and wherein the at least two supports comprise between three and ten inlet supports proximal to the inner tube entrance and between three and ten outlet supports proximal to the inner tube exit.

8. The device of claim 7, wherein the inlet supports comprise between eight and ten inlet supports proximal to the inner tube entrance.

9. The device of claim 7, wherein the inlet supports are turned at between approximately thirty five degrees and approximately fifty five degrees from the central axis.

10. The device of claim 7, wherein the outlet supports comprise four outlet supports proximal to the inner tube exit.

11. The device of claim 10, wherein the at least two supports are turned at approximately forty five degrees from the central axis.

12. The device of claim 7, wherein the outlet supports are turned at approximately sixty degrees from the central axis.

13. The device of claim 1, wherein the at least two supports are between approximately one half inches long and approximately five eighths inches long.

14. The device of claim 1, wherein the vanes extend between approximately three sixteenths and approximately one fourth inches outwardly from the outside surface of the inner tube.

15. The device of claim 14, wherein the inner tube has an inside surface, and wherein the vanes further extend between approximately three sixteenths and approximately one fourth inches inwardly from the inside surface of the inner tube.

16. The device of claim 14, wherein the vanes comprise pairs of vanes on opposite sides of the inner tube, and wherein the vanes are between approximately two inch and approximately three inch segments, which segments are spaced between approximately one half inches and approximately one inch apart.

17. The device of claim 1, wherein the reliefs are between approximately one eighth inches and approximately three sixteenths inches wide.

18. An exhaust extracting device comprising:
an outer tube having:
an inlet;
an inlet adapter portion between approximately four inches long and approximately six inches long and having an inlet adapter entrance and an inlet adapter exit;
an increased diameter center portion;
an outlet adapter portion between approximately four inches long and approximately six inches long and having an outlet adapter entrance and an outlet adapter exit; and
an outlet, and a central axis;
an inner tube substantially co-axial with said outer tube, the inner tube having an outer surface, an inner tube entrance and an inner tube exit;
helically oriented vanes extending outward from the outer surface of the inner tube between approximately three sixteenths and approximately one fourth inches inwardly from the inside surface of the inner tube;
reliefs in the inner tube, wherein the reliefs are substantially parallel to the vanes; and
between three and ten inlet supports proximal to the inner tube entrance and between three and ten outlet supports proximal to the inner tube exit, said supports extending between the inner tube and the outer tube, wherein the supports are substantially orthogonal to the outer surface of the inner tube, and have a fanblade like orientation, wherein the vanes and supports cooperate to cause an outer air flow between the inner tube and the outer tube to rotate, wherein:

the inner tube entrance resides outwardly with respect to the inlet adapter exit toward the inlet adapter entrance between zero and seventy five percent of the distance between the inlet adapter exit and the inlet adapter entrance; and the inner tube exit resides outwardly with respect to the outlet adapter entrance toward the outlet adapter exit between zero and seventy five percent of the distance between the outlet adapter entrance and the outlet adapter exit.

19. An exhaust extracting device comprising:
an outer tube having:
an inlet;
an inlet adapter portion between approximately four inches long and approximately six inches long and having an inlet adapter entrance and an inlet adapter exit;
an increased diameter center portion;
an outlet adapter portion between approximately four inches long and approximately six inches long and having an outlet adapter entrance and an outlet adapter exit; and
an outlet, and a central axis;
an inner tube substantially co-axial with said outer tube, the inner tube having an outer surface and an inner surface, an inner tube entrance and an inner tube exit;
helically oriented vanes extending outward from the outer surface of the inner tube between approximately three sixteenths and approximately one fourth inches inwardly from the inside surface of the inner tube, and wherein the vanes also extend between approximately three sixteenths and approximately one fourth inches inwardly from the inside surface of the inner tube;
reliefs in the inner tube, wherein the reliefs are substantially parallel to the vanes; and
between three and ten inlet supports proximal to the inner tube entrance and between three and ten outlet supports proximal to the inner tube exit, said supports extending between the inner tube and the outer tube, wherein the supports are substantially orthogonal to the outer surface of the inner tube, and have a fanblade like orientation, wherein the vanes and supports cooperate to cause an outer air flow between the inner tube and the outer tube to rotate, wherein:
the inner tube entrance resides outwardly with respect to the inlet adapter exit toward the inlet adapter entrance between zero and seventy five percent of the distance between the inlet adapter exit and the inlet adapter entrance; and
the inner tube exit resides outwardly with respect to the outlet adapter entrance toward the outlet adapter exit between zero and seventy five percent of the distance between the outlet adapter entrance and the outlet adapter exit.

* * * * *